(12) United States Patent
Walters (10) Patent No.: US 8,496,483 B1
(45) Date of Patent: Jul. 30, 2013

(54) EDUCATIONAL TOY WITH INTERCHANGEABLE SPHERES

(76) Inventor: George M. Walters, Staten Island, NY (US)

(*) Notice: Subject to any disclaimer, the term of this patent is extended or adjusted under 35 U.S.C. 154(b) by 250 days.

(21) Appl. No.: 13/004,669

(22) Filed: Jan. 11, 2011

Related U.S. Application Data (60) Provisional application No. 61/399,024, filed on Jul. 6, 2010.

(51) Int. Cl.
*G09B 1/00* (2006.01)

(52) U.S. Cl.
USPC .................................................. 434/172

(58) Field of Classification Search
USPC ................ 434/167, 170, 172, 174, 188, 203, 434/204, 404
See application file for complete search history.

(56) References Cited

U.S. PATENT DOCUMENTS

| | | | | |
|---|---|---|---|---|
| 378,866 A | * | 3/1888 | Clark et al. | 434/203 |
| 407,374 A | * | 7/1889 | Smith | 434/174 |
| 1,099,009 A | * | 6/1914 | Bennett | 434/203 |
| 2,330,538 A | | 9/1943 | Allen | |
| 3,010,227 A | | 11/1961 | Glass | |
| 3,407,530 A | * | 10/1968 | Grant et al. | 446/92 |
| 4,123,853 A | * | 11/1978 | Dickensheet | 434/184 |
| 4,146,978 A | | 4/1979 | Breslow | |
| 4,212,117 A | | 7/1980 | Baldwin et al. | |
| 4,295,832 A | * | 10/1981 | Karell | 434/168 |
| 4,509,920 A | | 4/1985 | Kaufmann | |
| 4,534,736 A | * | 8/1985 | Cogdill | 434/403 |
| 4,879,882 A | | 11/1989 | Johnson et al. | |
| 4,993,952 A | * | 2/1991 | Yeh | 434/191 |
| 5,149,269 A | * | 9/1992 | Ylitalo | 434/203 |
| 5,395,245 A | | 3/1995 | Heinz | |
| 6,315,675 B1 | * | 11/2001 | Ho | 473/1 |
| 6,607,388 B2 | | 8/2003 | Cogliano | |
| 6,612,766 B2 | * | 9/2003 | Collins | 401/88 |
| D587,756 S | * | 3/2009 | Rule | D19/62 |
| 7,828,553 B2 | * | 11/2010 | Baerg | 434/203 |
| 8,105,088 B2 | * | 1/2012 | Charles | 434/127 |

FOREIGN PATENT DOCUMENTS

| | | |
|---|---|---|
| CN | 2046646 | 10/1989 |
| GB | 2.054.235 | 2/1981 |

* cited by examiner

*Primary Examiner* — Kurt Fernstrom
(74) *Attorney, Agent, or Firm* — Michael I. Kroll (57) ABSTRACT

An educational toy with interchangeable spheres for teaching the user to produce words, progressions, mathematics, patterns and other educational arrangements and sequences comprising a shaft with a permanently affixed stationary sphere on one end and a removable threaded sphere on the other. A plurality of educational balls having various graphics and horizontal throughbores that are slid onto the shaft in a user selected order when the threaded sphere is removed and retained thereon when it is replaced.

10 Claims, 9 Drawing Sheets

EDUCATIONAL TOY WITH INTERCHANGEABLE SPHERES

RELATED APPLICATIONS

This application is a continuation-in-part of U.S. patent application Ser. No. 61/399,024, filed 6 Jul. 2010.

Please incorporate by reference all information in said patent application into this continuation-in-part application.

BACKGROUND OF THE INVENTION

1. Field of the Invention

The present invention relates generally to educational toys and, more specifically, an educational toy whereby a child takes a stationary sphere with a protruding shaft having threading at its distal end, and then skewering a plurality of smaller educational spheres having a horizontal throughbores with said shaft inserted therethrough and then sealing the educational spheres on the shaft utilizing a threaded removable sphere. The educational spheres are used by the child in order to produce words, progressions, mathematics, patterns and other educational arrangements and sequences.

2. Description of the Prior Art

There are other educational toys. While these toys may be suitable for the purposes for which they where designed, they would not be as suitable for the purposes of the present invention as heretofore described.

SUMMARY OF THE PRESENT INVENTION

A primary object of the present invention is to provide an educational toy having a plurality of interchangeable spheres disposed on a shaft.

Another object of the present invention is to provide an educational toy having a plurality of educational spheres having horizontal throughbores replaceably disposed on a shaft.

Still another object of the present invention is to provide an educational toy wherein said educational spheres are prevented from passing through said shaft by a permanently affixed sphere on a first end.

Yet another object of the present invention is to provide an educational toy wherein said educational spheres are provided access and retained on said shaft by a selectively removable threaded sphere disposed on the threaded second end of the shaft.

Still yet another object of the present invention is to provide an educational toy wherein said educational spheres contain alphabetical and numeric indicia, varying colors or pictorial designs.

Additional objects of the present invention will appear as the description proceeds.

The present invention overcomes the prior art by providing a shaft with a plurality of interchangeable educational spheres that are used by a child in order to produce words, progressions, mathematics, patterns and other educational arrangements and sequences.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing figures in which.

DESCRIPTION OF THE REFERENCED NUMERALS

Turning now descriptively to the drawing figures, in which similar reference characters denote similar elements throughout the several views, the figures illustrate the Educational Toy with Interchangeable Spheres of the present invention. With regard to the reference numerals used, the following numbering is used throughout the various drawing figures.

10 Educational Toy with Interchangeable Spheres of the present invention
12 educational sphere
14 retaining sphere
16 user
18 threaded sphere
20 stationary sphere
22 shaft
24 indicia
26 threaded end of 22
28 threaded aperture 28
30 throughbore of 12
32 first end of 12
34 second end of 12
36 graphic sets of 12
38 alphabetical indicia set
40 numerical indicia set
42 color set
44 pictorial illustration set

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
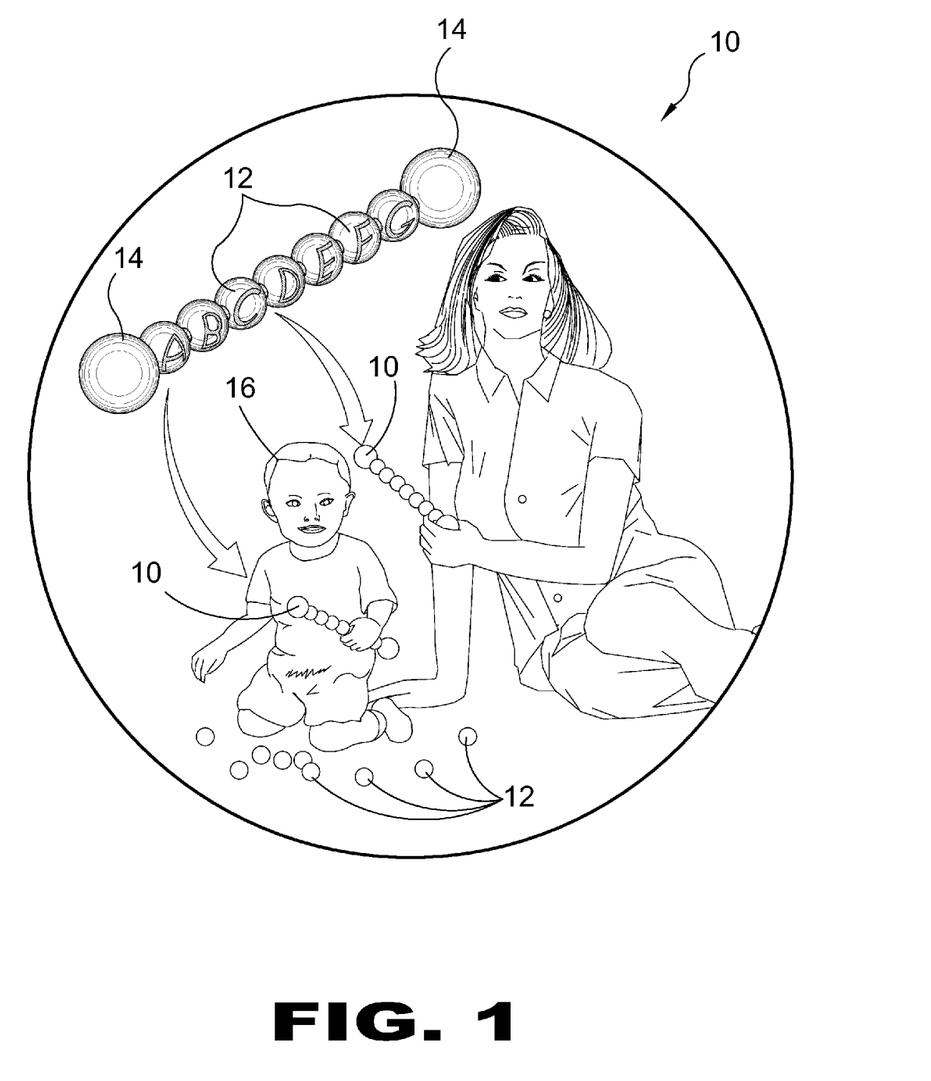
FIG. 1 is an illustrative view of the present invention.

FIG. 1 is an illustrative view of the present invention. Shown is the present invention being an educational toy 10 whereby the user 16 takes a stationary retaining sphere 14 with a protruding shaft having threading at its distal end, and then skewering a plurality of smaller, interchangeable educational spheres 12 having horizontal throughbores for inserting the shaft therethrough and then sealing the educational spheres 12 on the shaft utilizing a threaded removable retaining sphere 14. The educational spheres 12 are used by the user 16 in order to produce words, progressions, mathematics, patterns and other educational arrangements and sequences.

Figure 2:
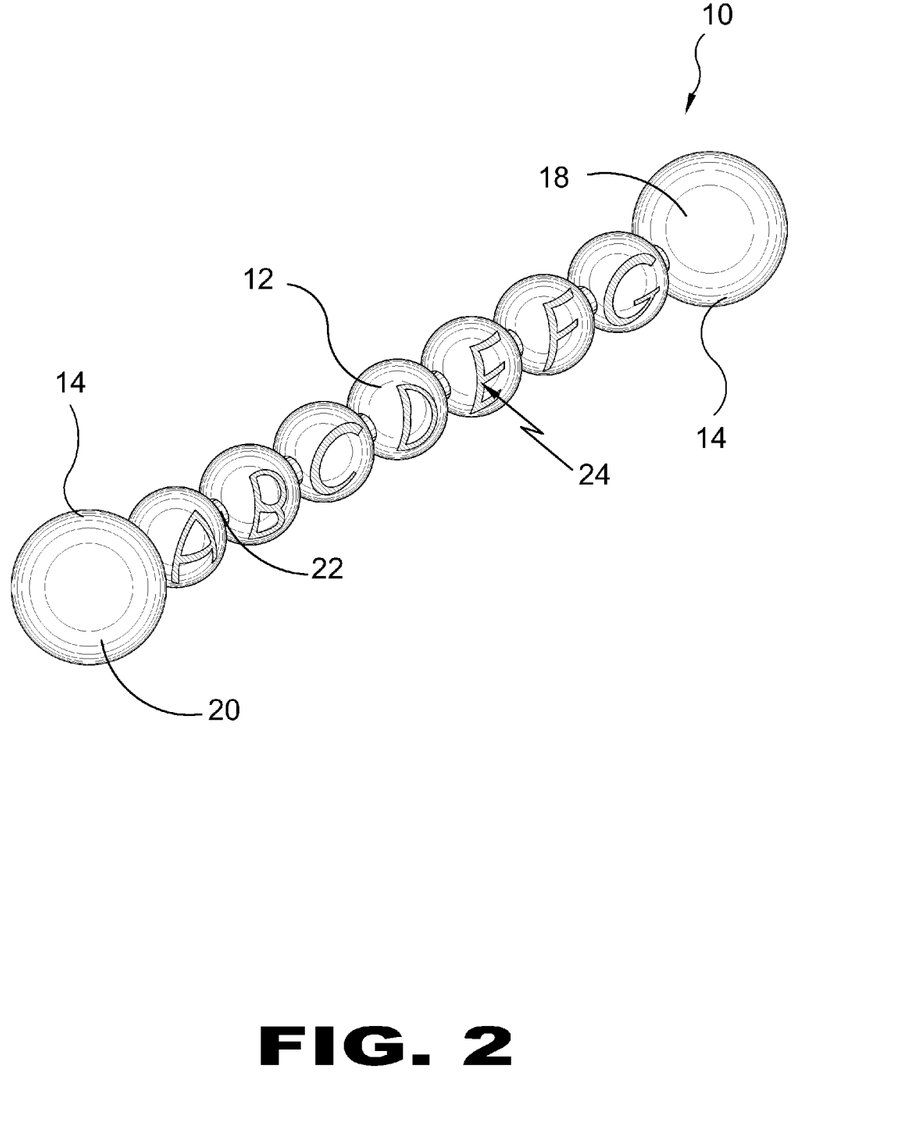
FIG. 2 is a perspective view of the present invention.

FIG. 2 is a perspective view of the present invention. Shown is the educational toy 10 having a plurality of interchangeable educational spheres 12 disposed on a shaft 22 and maintained thereon by a pair of retaining spheres 14 on opposing ends thereof. The retaining spheres 14 comprise a permanently affixed stationary sphere 20 on one end of the shaft 22 and a removable threaded sphere 18 on the opposing end thereof. Indicia 24 may be disposed on the educational spheres 12.

Figure 3:
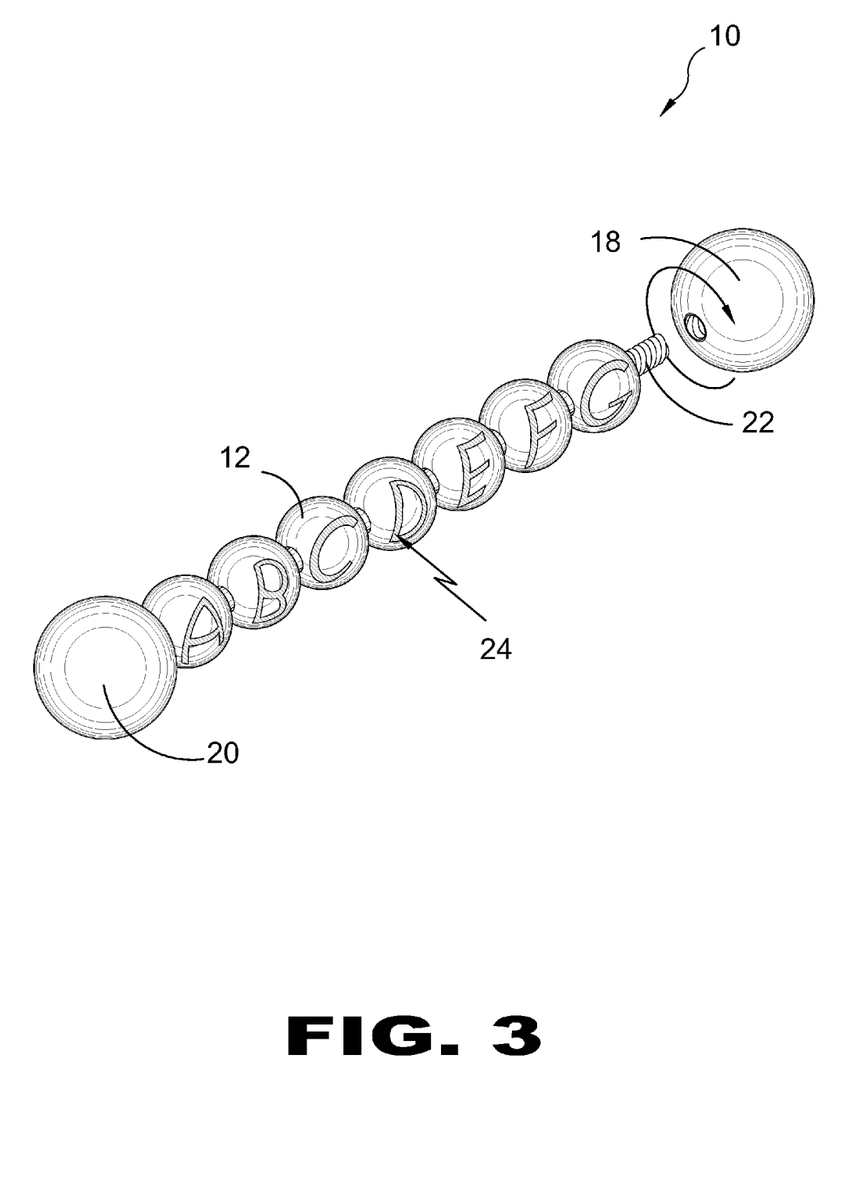
FIG. 3 is a perspective view of the present invention.

FIG. 3 is a perspective view of the present invention. Shown is the educational toy 10 with the threaded sphere 18 removed from the shaft 22 to provide access to the educational spheres 12 to rearrange them according to indicia 24, color or pictorial images disposed thereon as desired.

Figure 4:
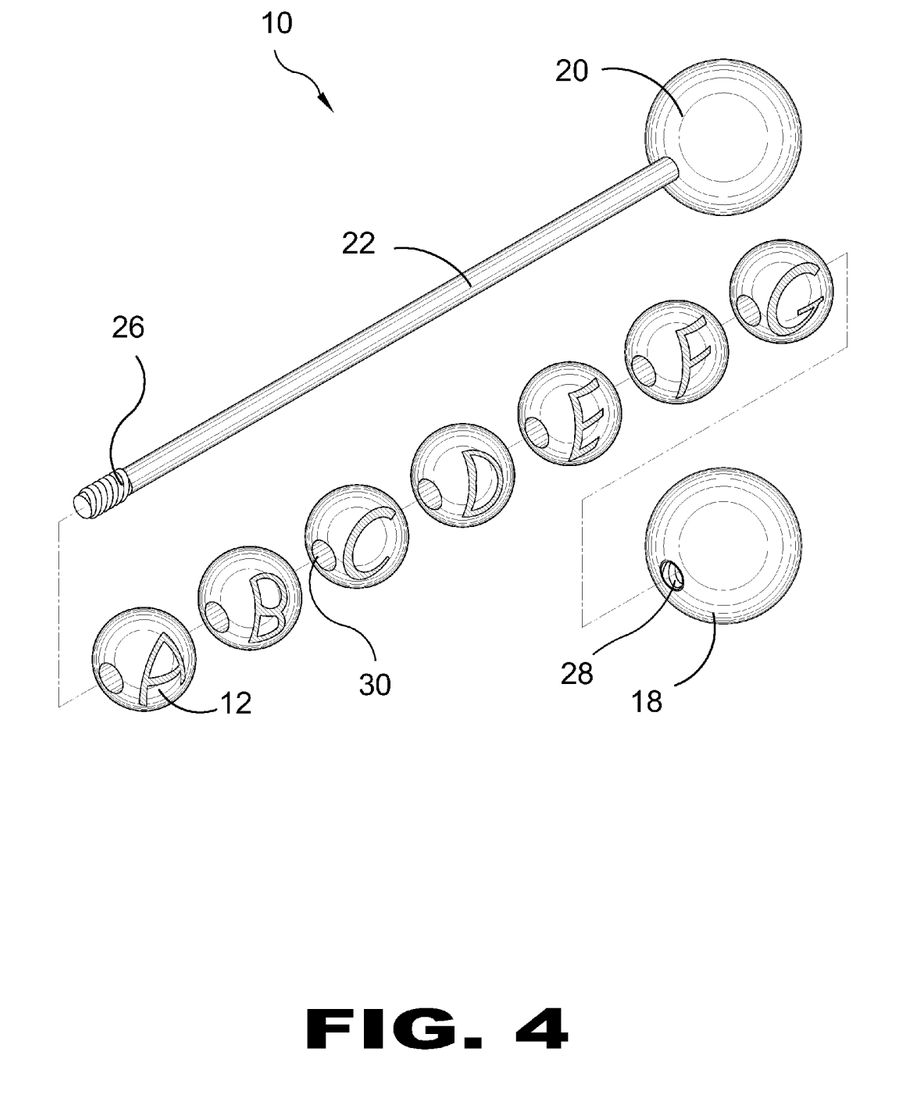
FIG. 4 is an exploded perspective view of the present invention.

FIG. 4 is an exploded perspective view of the present invention. Shown is the educational toy 10 with the threaded sphere 18 removed to enable the user to rearrange or change the educational spheres 12 accordingly as the shaft 22 is inserted therethrough. Once the educational spheres are in place, the threaded end 26 of the shaft 22 is threaded into a mating threaded aperture 28 in the threaded sphere 18 to maintain the educational spheres 12 in place on the shaft 22 between the threaded sphere 18 and the stationary sphere 20.

Figure 5:
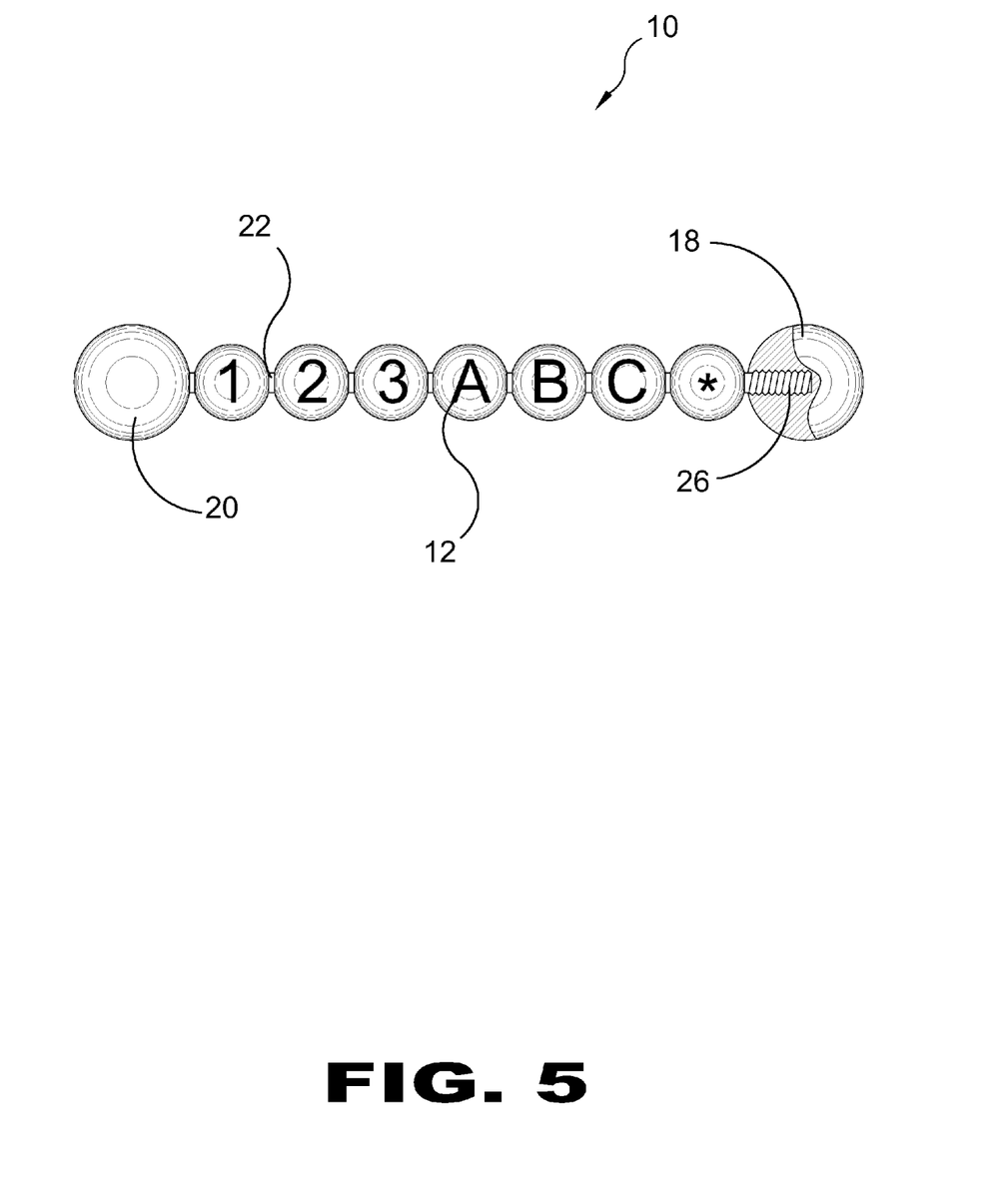
FIG. 5 is a front view of the present invention.

FIG. 5 is a partial sectional front view of the present invention. Shown is the educational toy 10 with the educational spheres 12 mounted on the shaft 22 and the threaded sphere 18 threaded onto the threaded end 26 of the shaft 22 to retain the educational spheres 12 between the stationary sphere 20 and the threaded sphere 18.

Figure 6:
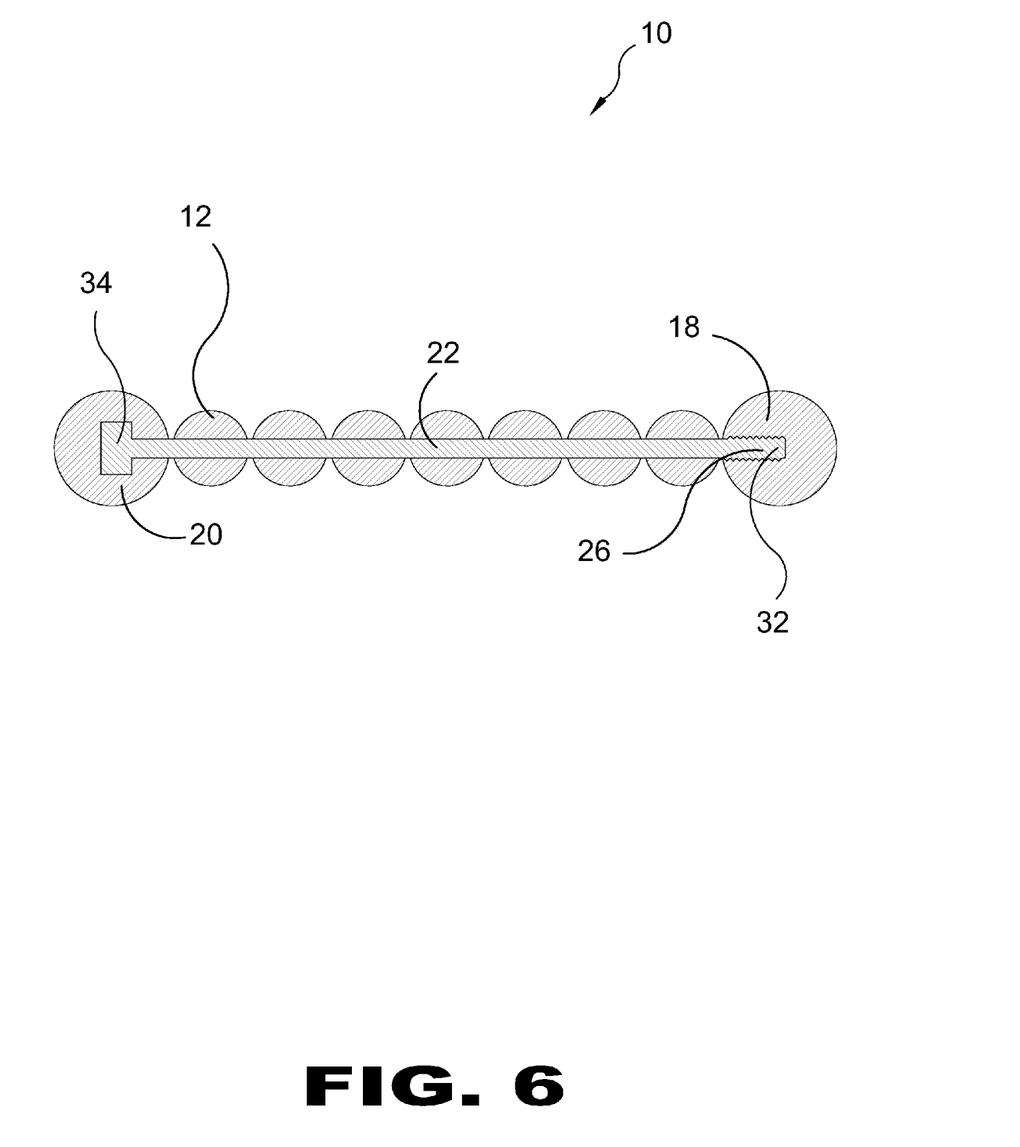
FIG. 6 is a side sectional view of the present invention.

FIG. 6 is a side sectional view of the present invention. Shown is the educational toy 10 with the educational spheres 12 mounted on the shaft 22 having a first end 32 that is threaded 26 to allow for the replaceable fastening of threaded sphere 18 thereto and a second end 34 that is permanently embedded in the stationary sphere 20.

Figure 7:
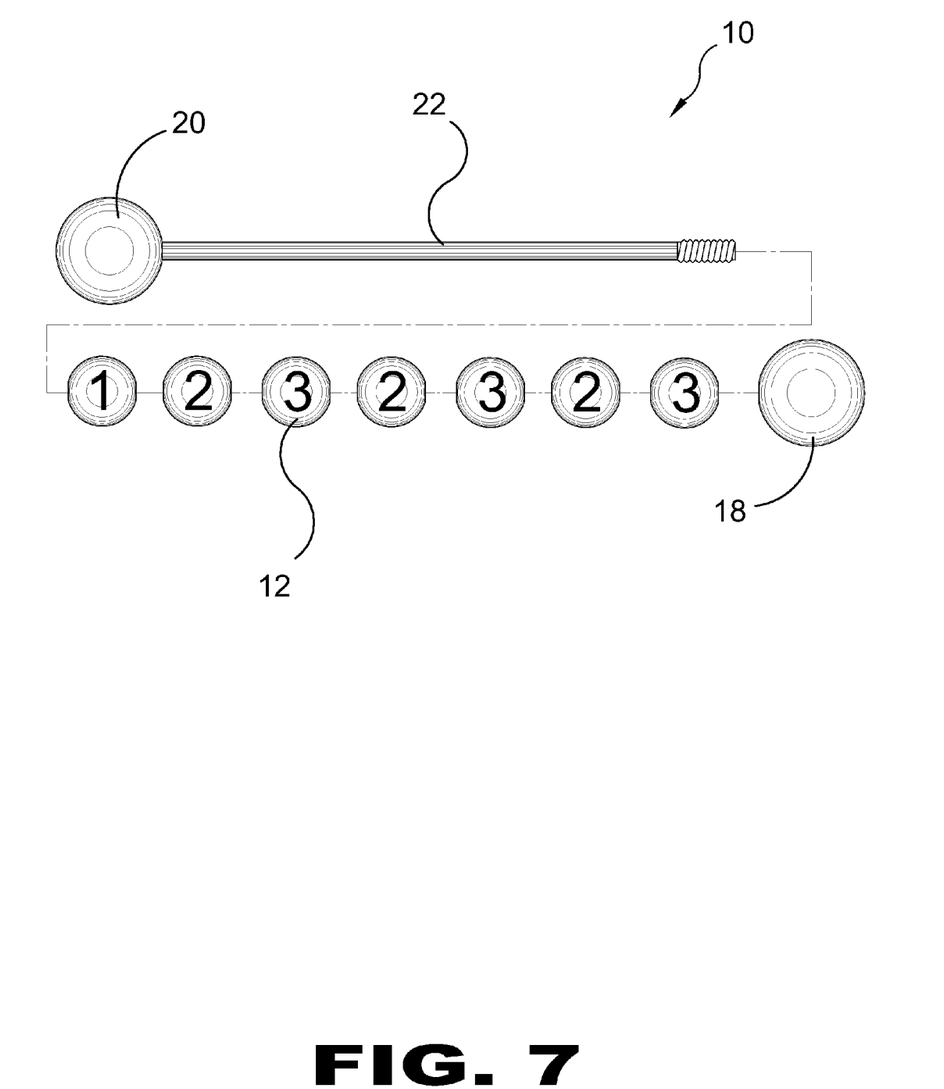
FIG. 7 is a side assembly view of the present invention.

FIG. 7 is a side assembly view of the present invention. Shown are the primary components of the educational toy 10 with a fixed stationary sphere with a shaft 22 projecting therefrom onto which the educational spheres 12 are placed and retained thereon when the threaded sphere 18 is threaded onto the shaft 22.

Figure 8:
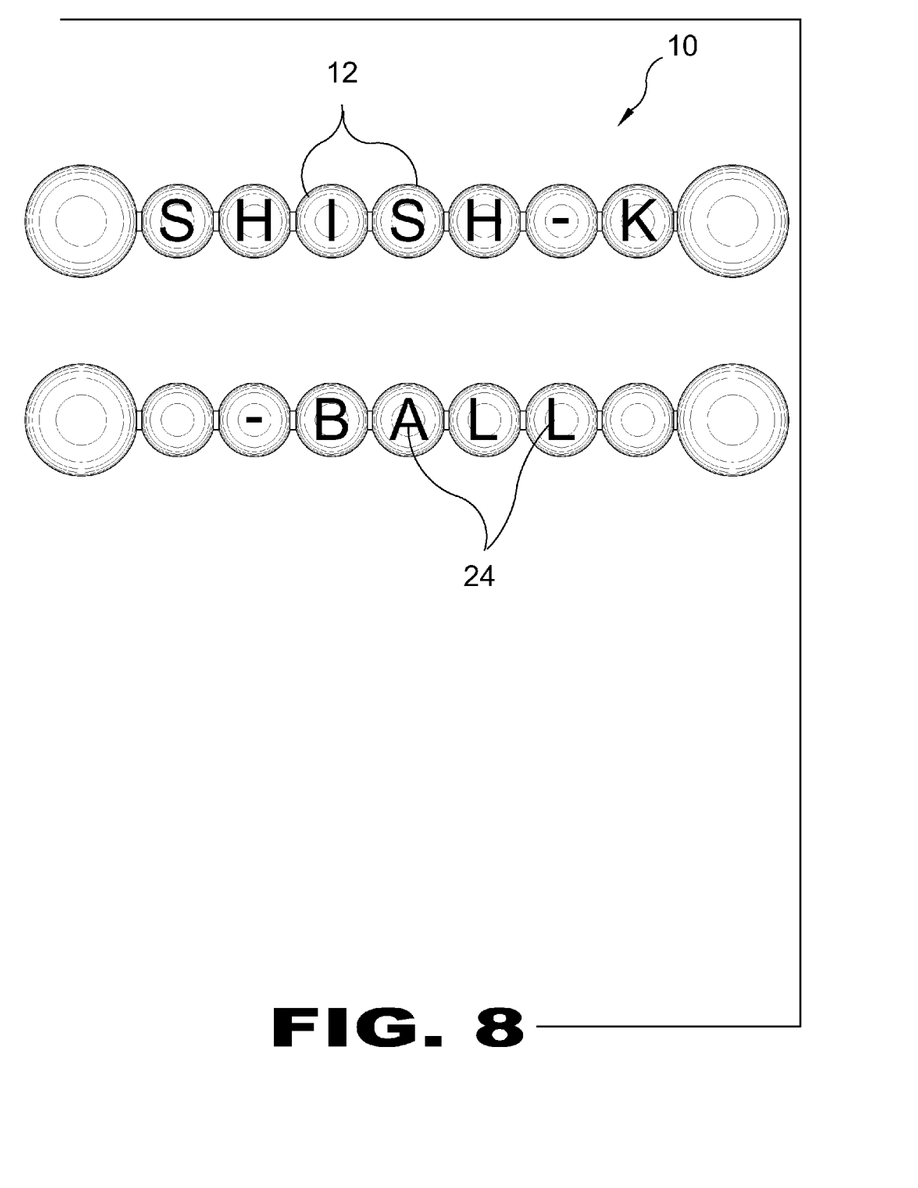
FIG. 8 is a side view of the present invention.

FIG. 8 is a side view of the present invention. Shown is a pair of assembled educational toys 10 demonstrating an example of the usage of the indicia 24 on the educational spheres 12.

Figure 9:
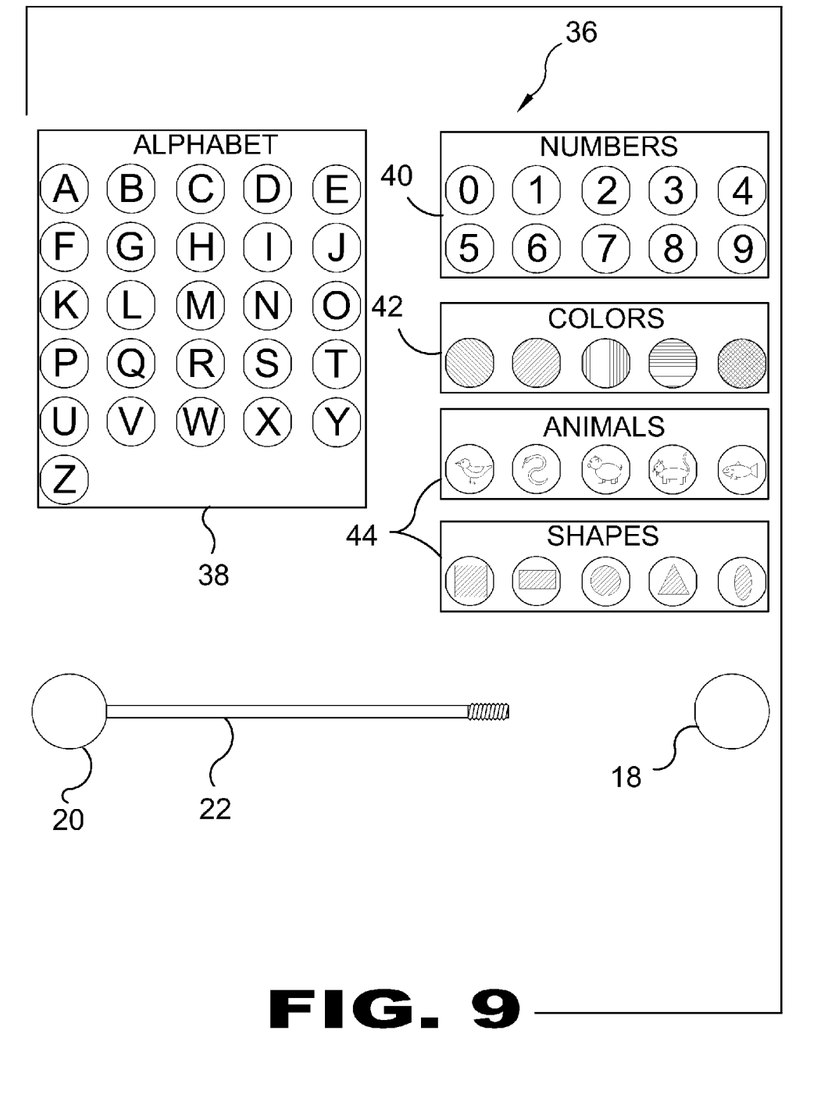
FIG. 9 is a diagram view of the present invention.

FIG. 9 is a diagram view of the present invention. Depicted is a plurality of graphic sets 36 of educational spheres 12 including an alphabetical indicia set 38, a numerical indicia set 40, a set with varying colors 42 and sets with pictorial illustrations 44 including animals, shapes, characters and the like. Also shown is the stationary sphere 20 with integral shaft 22 and the threaded sphere 18.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An educational toy with interchangeable spheres for teaching the user to produce words, progressions, mathematics, patterns and other educational arrangements and sequences comprising:
   a) a permanently affixed stationary sphere mounted on one end of a shaft, said shaft terminating within said stationary sphere;
   b) an opposite end of said shaft being threaded;
   c) a removable threaded sphere mounted on and being engaged with threads on said opposite end of said shaft, said threads on said shaft being of sufficient length to support only said threaded sphere, and said shaft terminating within said threaded sphere;
   d) a plurality of educational spheres having horizontal throughbores; and
   e) said plurality of educational spheres removably mounted on said shaft between said stationary and threaded sphere, said educational spheres comprising indicia and being configured to be arranged and rearranged by a child to produce words, progressions, mathematics, patterns or other educational arrangements and sequences, said educational spheres filling the space on said shaft between said stationary and threaded spheres.

2. The educational toy with interchangeable spheres according to claim 1, wherein said indicia is alpha-numeric.

3. The educational toy with interchangeable spheres according to claim 2, wherein said educational spheres are provided in varying colors.

4. The educational toy with interchangeable spheres according to claim 3, wherein said educational spheres are provided with pictorial illustrations disposed thereon.

5. The educational toy with interchangeable spheres according to claim 4, wherein said educational spheres are provided with a combination of indicia, colors and pictorial illustrations.

6. The educational toy with interchangeable spheres according to claim 5, wherein once said threaded sphere is removed, said shaft is inserted through said throughbores of selected educational spheres in a user selected order.

7. The educational toy with interchangeable spheres according to claim 6, wherein said threaded sphere is threaded onto said threaded end of said shaft to effectively maintain said educational spheres in position on said shaft as they are sandwiched between said stationary sphere and said threaded sphere.

8. The educational toy with interchangeable spheres according to claim 1, wherein said educational spheres have a circumference lesser than that of the retaining spheres.

9. A method for employing an educational toy with interchangeable spheres for teaching the user to produce words, progressions, mathematics, patterns and other educational arrangements and sequences comprising the steps:
   a) providing a permanently affixed stationary sphere mounted on one end of a shaft, said shaft terminating within said, said shaft being threaded;

b) providing a removable threaded sphere mounted on and being engaged with threads on said opposite end of said shaft, said threads on said shaft being of sufficient length to support only said threaded sphere, and said shaft terminating within said threaded sphere;

c) providing a plurality of educational spheres having horizontal throughbores;

d) providing said educational spheres with graphics selected from the group of alphabetical indicia, numerical indicia, colors and pictorial illustrations;

e) removing said threaded sphere from said shaft to provide access thereto;

f) a child selecting said educational spheres to be employed on said shaft and the order desired for placement thereon;

g) inserting said shaft through said throughbores of said educational spheres with the first one thereof residing adjacent said stationary sphere and progressing upward along said shaft toward said threaded distal end;

h) threading said threaded sphere to said shaft to retain said educational spheres between said threaded sphere and said stationary sphere, said shaft terminating at both ends thereof within respective stationary and removable spheres, and said educational spheres filling the space on said shaft between said stationary and threaded sphere;

i) removing said threaded sphere from said shaft to rearrange said educational spheres or swap them out for others; and j) said child mounting said educational spheres on said shaft to produce words and other educational arrangement including placing said educational spheres on said shaft and attaching said removable sphere.

10. The method for employing said educational toy with interchangeable spheres according to claim 9, further comprising the step of providing said educational spheres divided into sets according to their graphic groups.

* * * * *